(12) United States Patent
Epstein et al.

(10) Patent No.: US 7,052,168 B2
(45) Date of Patent: May 30, 2006

(54) ILLUMINATION DEVICE

(75) Inventors: Kenneth A. Epstein, St. Paul, MN (US); Leland R. Whitney, St. Paul, MN (US); Charles D. Hoyle, Stillwater, MN (US); Wade D. Kretman, Afton, MN (US)

(73) Assignee: 3M Innovative Properties Company, St, Paul, MN (US)

( * ) Notice: Subject to any disclaimer, the term of this patent is extended or adjusted under 35 U.S.C. 154(b) by 67 days.

(21) Appl. No.: 10/738,441

(22) Filed: Dec. 17, 2003

(65) Prior Publication Data

US 2005/0135116 A1   Jun. 23, 2005

(51) Int. Cl.
*F21V 7/04* (2006.01)
(52) U.S. Cl. ............... 362/625; 362/619; 362/615
(58) Field of Classification Search ......... 362/600–634
See application file for complete search history.

(56) References Cited

U.S. PATENT DOCUMENTS

| 5,461,547 A | * | 10/1995 | Ciupke et al. ............. 362/617 |
| 5,485,291 A | | 1/1996 | Qiao et al. |
| 5,640,483 A | | 6/1997 | Lin |
| 6,464,366 B1 | * | 10/2002 | Lin et al. .................... 362/616 |
| 6,568,832 B1 | | 5/2003 | Pillai et al. |
| 2002/0021563 A1 | | 2/2002 | Ohsumi |
| 2002/0093832 A1 | | 7/2002 | Hamilton |
| 2003/0016521 A1 | | 1/2003 | Wang et al. |

FOREIGN PATENT DOCUMENTS

| JP | 2001-266630 | 9/2001 |
| WO | WO 03/048635 | 6/2003 |

\* cited by examiner

*Primary Examiner*—Thomas M. Sember
*Assistant Examiner*—James W Cranson, Jr.
(74) *Attorney, Agent, or Firm*—William D. Miller

(57) ABSTRACT

An illumination system includes a light guide for distributing light. Extraction structures are provided to uniformly extract light from the light guide. The structures extract more light out of the light guide when light is propagating in the light guide in a direction toward the light input area than when light is propagating in the light guide in a direction away from the light input area.

25 Claims, 14 Drawing Sheets

ILLUMINATION DEVICE

FIELD OF THE INVENTION

This invention relates generally to illumination devices. In particular, the invention relates to illumination devices having a light guide wherein light is extracted out of the light guide differently depending on the direction of light propagation in the light guide.

BACKGROUND OF THE INVENTION

In the field of lighting, there are a number of applications that call for lighting systems that illuminate large surface areas. In many of these lighting systems, it is desirable to have the distance between the light source and the illuminated object as small as possible. It is therefore desirable to provide a uniform illumination system that is thin and that can be made at an acceptable cost.

One such lighting system, commonly referred to as an edge lit system, uses a light guide to distribute light, introduced into the light guide at an edge of the light guide, over a relatively large surface area. Such systems are used commonly as backlights for display devices such as liquid crystal display (LCD) panels. Such display devices are commonly used today for a large variety of applications ranging from televisions, computer displays and handheld devices. One of the principal reasons for the popularity of LCD display panels is their small size and thickness and relatively low power consumption.

Conventional edge lit light sources typically use a tubular lamp such as a cold-cathode fluorescent lamp (CCFL.). Light emitted by a CCFL is typically coupled into a solid light guide, which forms a light-emitting panel. The surface area of the light-emitting panel usually corresponds to the area of a display panel to be illuminated. The light-emitting panel typically has one surface (an illumination surface) through which light is extracted from the light guide.

In recent years, alternative light sources have been developed and explored in an effort to provide brighter more efficient lighting. One example of such alternative light sources are point light sources, such as light-emitting diodes (LEDs). There is increased effort to use such light sources in place of the CCFL light sources. While a number of advantages are associated with LED light sources, they present new challenges for distributing the light uniformly over a surface area. Additionally, using currently available LEDs, it is often desirable to use a combination of LEDs of different colors to provide white light. In such a system, the different colors of light must be efficiently mixed to provide uniform, white light.

One example of an LED-based light source is illustrated in FIG. 1. A light-emitting panel 1 has a front wall 2 and an opposed rear wall 3. The panel 1 is bound by end surfaces 4, 5. At least one of the end surfaces 4 is light transmitting. The backlight system has a light source 6 such as multiple LEDs. Light from the light source 6 is coupled into the light-emitting panel 1 through the edge surface 4. The panel 1 is wedge shaped such that the light-emitting panel increases in thickness in a direction away from the light source 6. This light source is more fully described in published Patent WO 03\048635. Such a system relies on frustrated total internal reflection (TIR) to extract light from the light guide. As will be appreciated from the description of the present invention, it is difficult to extract light out of such a system in a spatially uniform manner. There remains a continuing need to provide improved surface area light sources that efficiently distribute light and are small in size and low cost.

SUMMARY OF THE INVENTION

Generally, the present invention relates to improved illumination systems. In one embodiment, such a lighting system may include a light guide. The light guide has an area where light is introduced into the light guide. The light may propagate in the guide between two surfaces. Means are provided for extracting light out of the light guide such that more light is extracted from the light guide when light is propagating in a direction toward the light input area than when the light is propagating in a direction away from the light input area. This allows light to remain in the light guide for a sufficient amount of time to improve spatial or spectral uniformity. Extraction structures may be used to more uniformly extract light from the light guide. The light guide may also be combined with means for redirecting light extracted from the light guide in a preferred direction. In this manner the light may be redirected in a direction where it is more useful. Such a lighting system is preferably combined with a backlit display such as an LCD.

In one embodiment of an illumination system different colored LEDs are used to generate light. The light is distributed over a surface of a light guide. Means is provided for extracting light from the light guide in a manner that both uniformly mixes the different colored LEDs and provides spatial uniformity for the extracted light.

In one particular embodiment the illumination system has a light guide that includes a light input area through which light is introduced into the light guide, where it propagates between first and second opposing surfaces. A portion of the light guide near the light input area has extraction structures that extract more light out of the light guide if it is propagating in the light guide in a direction toward the light input area than when it is propagating in a direction away from the light input area. In one particular embodiment, the extraction structures include facets provided on at least one surface. At least some of the facets are shadowed when the light is propagating in the direction away from the light input area. In still another embodiment, the opposing surfaces diverge in a direction away from the light input area.

In accordance with the present invention solid and hollow light guides may be used. When a solid light guide is use, in one particular embodiment light is contained within the light guide by total internal reflection and is extracted from the light guide by total internal reflection at the interface of an extraction facet. In yet another embodiment, extraction structures may be made up of unit cells. Each unit cell may include a number of facets. At least one facet is shadowed from light introduced from the light input area when the light is propagating in the direction away from the light input area. The extraction structures may be disposed on only a portion of the light guide or may distributed over the entire light guide.

In accordance with other embodiments of the invention a light guide may be provided with additional structures disposed on one or both of the opposing major surfaces of the light guide. The additional structures are provided to control the angular direction of light extracted from the light guide in a direction that is substantially orthogonal to a principal axis of the extraction structures. In one embodiment the extraction structures include facets running along a first axis and the additional structures include facets running along a second, different axis. In one particular embodiment the first and second axes are orthogonal. It will be appreciated that the extraction and additional structures may be on the same or opposite surfaces or both structures may be on both surfaces.

An illumination system, according to the present invention will also typically include a light source. A light source particularly suited for the present invention is a point light source, such as an LED. The illumination system may also desirably include a structured film disposed to receive from the light guide and redirect the light in a desired direction. The structured film may have a number of linear prisms disposed to redirect the light. Such films can be used with the prisms facing toward the light guide or away from the light guide depending on the construction of the light guide. The illumination system may also include a structured reflector disposed adjacent the bottom surface of the light guide to redirect a portion of light escaping through the bottom surface back toward the light guide. The illumination system may be used to illuminate a display panel, such as a liquid crystal display (LCD). The above-described structured films may be disposed between the display panel and the light guide.

The above summary of the present invention is not intended to describe each disclosed embodiment or every implementation of the present invention. The Figures and the detailed description that follow more particularly exemplify these embodiments.

BRIEF DESCRIPTION OF THE DRAWINGS

The invention may be more completely understood in consideration of the following detailed description of various embodiments of the invention in connection with the accompanying drawings, in which.

Figure 1:
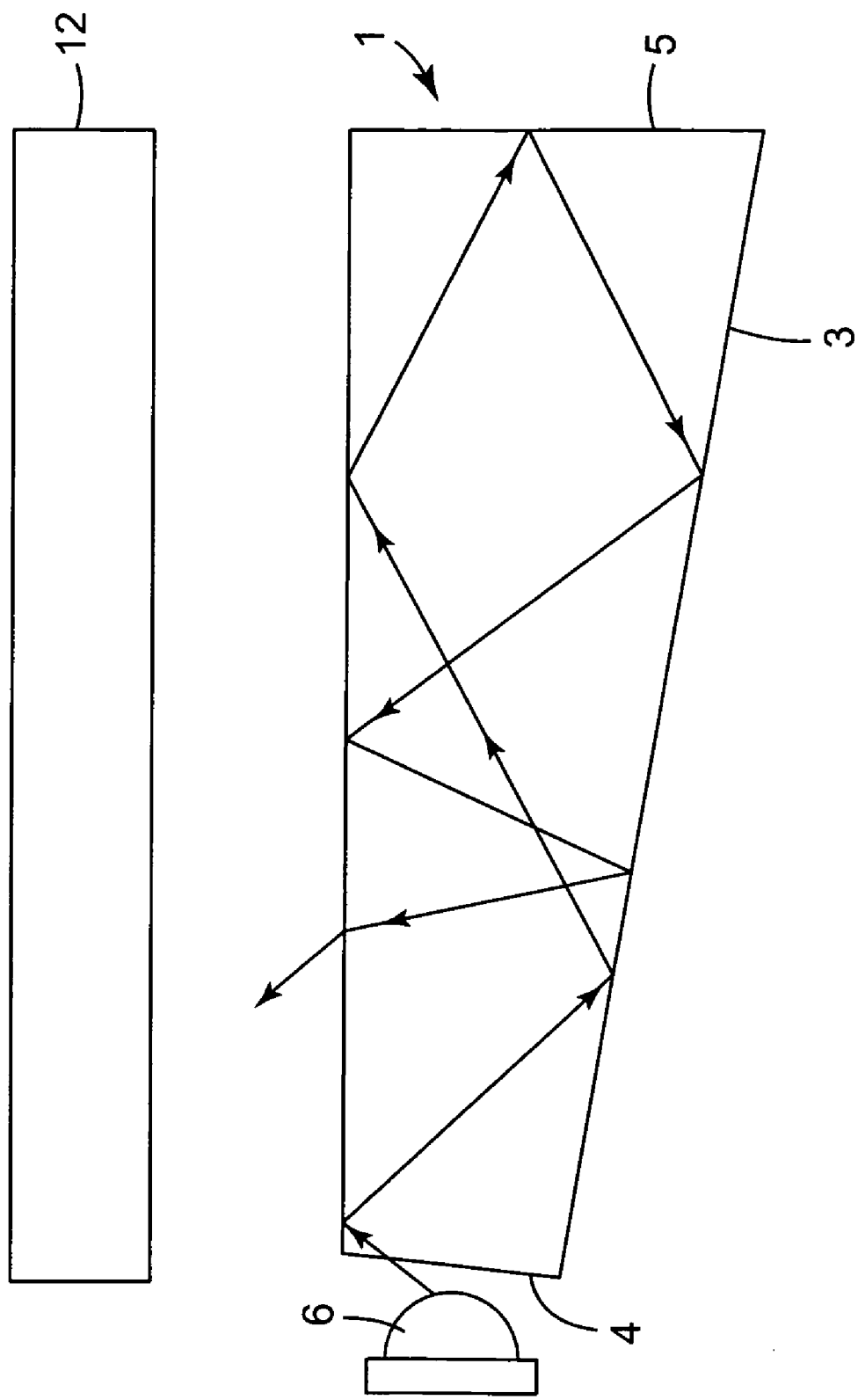
FIG. 1 illustrates a conventional lighting system.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the description and inventions claimed. It will also be appreciated that unless otherwise noted, the various drawings are not drawn to scale.

DETAILED DESCRIPTION OF THE ILLUSTRATED EMBODIMENTS

The present application is directed generally to lighting systems. More particularly, the present invention is directed to an improved illumination system. The illumination system has the ability to provide uniform lighting over a surface area. Light from multiple light sources such as LEDs can be mixed in order to improve lighting uniformity or to mix colors from different colored light sources to produce a desired illumination of blended colors, e.g., white.

In accordance with one aspect of the present invention, a light guide is provided which includes extracting structures provided on a surface of the light guide. The light guide and the structures cooperatively interact to improve the uniformity (and mixing) of light in and extracted from the light guide. In accordance with one particular embodiment of the invention, the lighting system includes an input area through which light is introduced into a light guide. Light introduced into the light guide propagates between opposing surfaces of the light guide. At least one of the opposing surfaces forms a light-emitting surface area. Light emitted from the light-emitting surface may be used to light a display such as an LCD panel. Light extraction and guiding structures may be disposed on at least a portion of one of the opposing surfaces to extract light out of the light guide. The structures are configured and arranged such that they extract more light out of the light guide when the light is propagating in the light guide in a direction toward the light input area than when the light is propagating in the light guide in a direction away from the light input area.

One advantage of using extraction structures to extract light from the light guide is that the spatial uniformity of the extract light can be improved. As will be appreciated from the description below, the extraction structures can be arranged and configured to deterministically extract light in a desired manner.

A number of aspects of the present invention can be illustrated through various embodiments. Both tapered and non-tapered light guides can be used in connection with the present invention. In a tapered light guide design, the taper can be used in conjunction with extraction structures to control the uniformity and directionality of light extracted from the light guide. A non-tapered light guide design, on the other hand can generally be made thinner as the overall thickness of the light guide remains essentially constant as you move away for the light guide. The taper in a tapered light guide provides some redirecting and collimating of the light in the guide. This is particularly suited for use with a Lambertian light source. Thus, when using a non-tapered light guide it is often desirable to use a less diffuse (more collimated) source. This reduces or eliminates the amount of light extracted as the light propagates over the structured surface in a direction away from the light source.

Another advantage of a taper design is that light can be more efficiently directed toward the end of the light guide opposite the light input area such that the overall mixing and/or uniformity is improved. This will be better understood by way of example. Consider a solid light guide with extraction structures formed on the bottom surface of the light guide. The extraction structures may be constructed of a number of facets. Some of the facets will be designed with relatively steep angles measured from a plane generally corresponding to the horizontal plane of the light guide. These facets, face away from the light input area and function to extract light from the light guide when the light is propagating toward the light input area. In order to reduce or minimize the overall thickness of the light guide, additional structures are provided that face toward the light input area to compensate for the steep change in angle. The angle of these structures needs to be relatively shallow so as to not extract light from the light guide during its initial pass down the light guide.

In a system such as the one described above, providing an overall taper to the light guide (i.e., the gross thickness increases in a direction away from the light input area), helps maintain the light in the light guide during the first pass down the light guide. In other words, the light guide may include a first set of facets that are shadowed and that extract light when it returns from the opposite end of the light guide, a second set of facets that restore the overall shape of the light guide, and a third set of facets that tend to collimate the light as it propagates in the light guide. This helps to reduce or prevent light from being extracted by the second set of facets. The breadth of the angular distribution of light at the input area determines, to an extent, the amount of extraction by the second facet. It is generally desirable to minimize this extraction. By correctly balancing the competing effects of these variables, a system can be designed that allows substantially all of the light to reach the opposing end of the light guide. Thus, in such a light guide, light can be mixed spatially and/or spectrally providing a uniform illumination system with desired angular output.

When selecting the angles of light introduced into the light guide (i.e., the angular range of light as it initially propagates within the light guide) one must consider the material used for the light guide, refractive index of the light guide, the angles of the structures disposed on the surface of the light guide, the thickness of the light guide and the length of the light guide. For example, when a non-tapered 1 mm thick, 30 mm long light guide design is desired, as described more fully below, it is desirable that the angles of initial propagation in the light guide are selected to be less than about 30° for a light guide having a refractive index of approximately 1.5. Smaller angles, for example 10–20°, would be more efficient. It is further desirable that the angles be large enough that substantial extraction occurs on the first pass back through the light guide.

In accordance with one aspect of an embodiment of the present invention, extraction structures are provided on the bottom surface of the light guide. The over all structure includes structures (e.g., facets) that are shadowed relative to the light source. In this manner, light propagating in a direction away from the light source is not incident on these structures. On the other hand, light propagating in an opposite direction in the light guide can encounter these structures and is extracted by the structure. In addition to structures or facets that are shadowed, other structures or facets may be provided that function to facilitate propagation of light within the light guide. When a tapered light guide is used, the structures can be distributed perturbations of the taper (e.g., the structures may not cover the entire surface). In such a system, part of the taper is unperturbed and does the same redirecting and collimating as a non-structured, tapered light guide. However, with the addition of the extraction structures a more uniform output can be obtained.

In one particular embodiment of the invention, the structures may be uniformly spaced. Uniformity can be obtained without varying the density or shape of the structures along the surface of the light guide. In another embodiment, light may be extracted more quickly by varying the pitch and/or geometry of the structures. The structures may be relatively small and include both shallow and steeper facet angles. By way of example, the pitch of a typical structure may be on the order of 250 to 500 microns per structure. Such structures could be formed into unit cells on the order of 750 to 1500 microns per unit cell. This would provide groove depths on the order of 5 to 10 microns. While larger and smaller structures may be used in accordance with the present invention, features falling with the mentioned range are particularly suited for the present invention. As the pitches get larger they may become discernable to the viewer in certain applications. Smaller pitches lead to shallower depths that are more difficult to precisely fabricate and may lead to diffractive effects.

As noted more fully below, a variety of different facets both in number and angle can be used. The shadowed facet angles, for example, could be as small as 25 degrees and as larger as 45 degrees. The angles of facets used to guide light propagating away from the light sources work particularly well in the range of 30 to 35 degrees.

As noted above, in one embodiment of the invention little or no light is extracted from the light guide as the light initially propagates the length of the guide. Thus, it is important that the light does not exit out the other end of the light guide. Some sort of reflector or structure suitable to return the light back toward the light source is therefore needed. Similarly, as all of the light will not necessarily be extracted on the second pass through the light guide (i.e., as the light returns to the light input area), it is also desirable to have a reflector in the input area of the device.

The light guide in general can be either solid or hollow. Different extraction structures are used for hollow light guides. When a solid light guide is used, extraction structures particularly suited for the invention are facets on the surface (e.g., molded into) the light guide. Such a light guide can be made using injection molding. A small tilt (~0.5 deg) can be added to the input and exit surfaces of the light guide to facilitate release from the mold while still providing the proper redirection of light. Light incident on the sides of the light guide will be contained in the light guide by TIR. Thus, no reflectors are needed at the sides.

As noted more fully below, other optical films and structures can be used in connection with the light guide to improve he uniformity and/or angular control of the light. A reflector disposed underneath the light guide may be used to reflect light that is not reflected (e.g., by TIR) from the structured bottom surface of the light guide back into the light guide. Light reflected by the bottom surface of the light guide and light reflected back into guide from an added bottom reflector would typically have different angular distributions. For example, light that is not reflected from the structured bottom surface of the light guide and is reflected back into the light guide by an additional bottom reflector may have a relative large peak angle (e.g., may have an angle of about 70 degrees in one embodiment). In such an embodiment, light reflected by the structure of the light guide has a peak angle of about 20 degrees. In accordance with one embodiment, structures can be placed on the bottom reflector that will be designed to redirect the light striking the additional bottom reflector at an angle more similar to that of the light extracted by the features on the light guide.

As noted above, the present invention is amenable to a number of different embodiments and aspects. Some more specific embodiments are described below to illustrate in a non-limiting way the breadth of this invention. The present invention should not be limited to the illustrated embodiments except as explicitly directed thereto.

Figure 2:
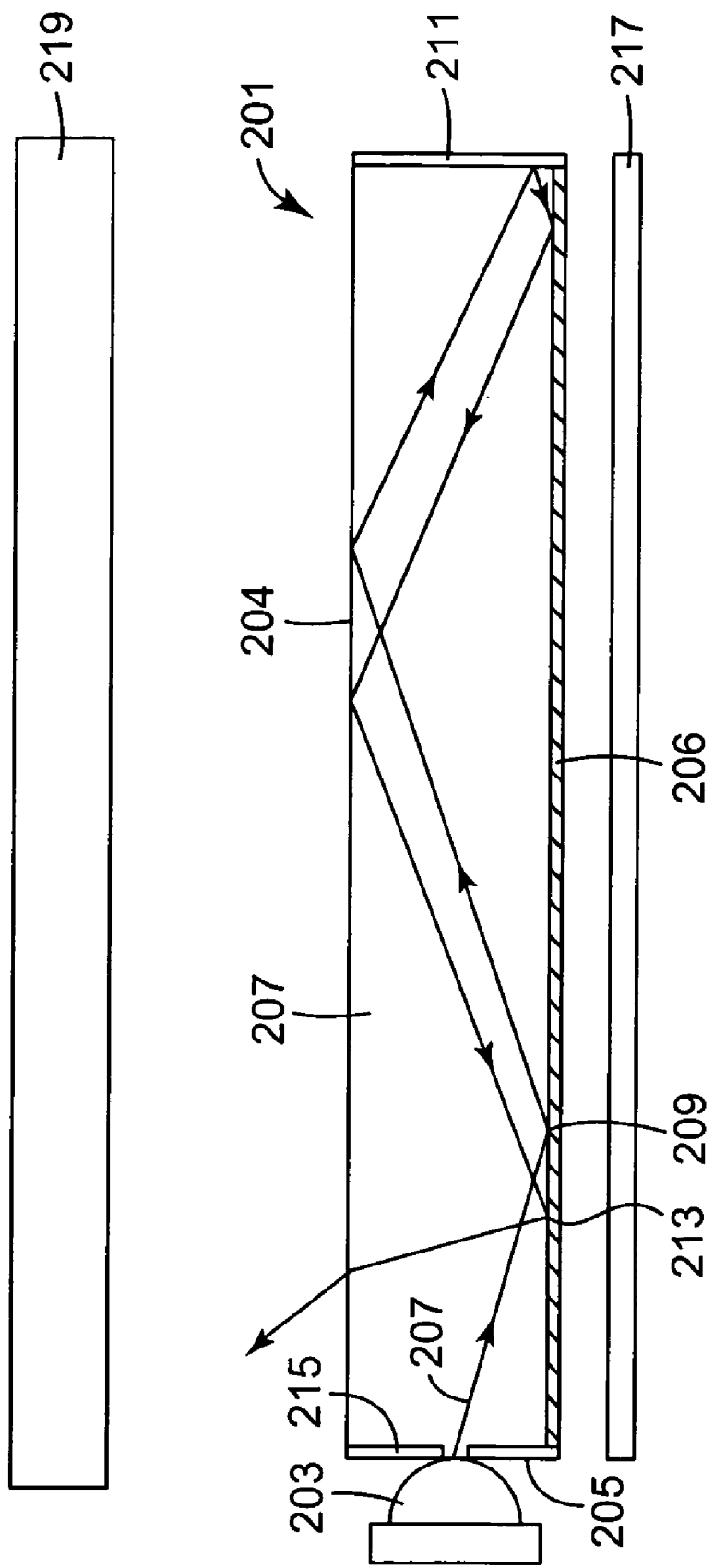
FIG. 2 illustrates a lighting system in accordance with an embodiment of the present invention.

FIG. 2 illustrates a cross section of an illumination device 201 in accordance with one particular embodiment of the invention. A light source 203 introduces a light into the light guide 202 at the light introduction area 205. In this particular embodiment, the light guide 202 is solid light guide and the light input area 205 is an edge bounding the light guide. The light source 203 may be a point light source, such as a light-emitting diode (LED). Light 207 introduced into the light guide 202 propagates between two opposing surfaces 204, 206 of the light guide 202. Light is bound within the light guide 202 by total internal reflection (TIR). A portion of at least one of the surfaces 206 includes extraction structures. The extraction structures are configured and arranged such that light propagating in the light guide 202 in a direction away from the light source 203 will either not be extracted or will be extracted less than light propagating in the light guide in a direction toward the light input area 205. As will be appreciated in FIG. 2, the light ray 207 encounters the structured surface 206 at a first point 209 with a propagation direction away from the light input area 205. The light continues to propagate within the light guide to the opposite edge 211. The opposing edge 211 of the light guide is reflective such that the light is redirected and propagates within the light guide back towards the light source 203. In one embodiment a specular reflector is provided on the end 211 of the light guide. While any specular reflector will be suitable that efficiently reflects light over the range of angles that light will be incident on the reflector, a multilayer optical film such as Enhanced Specular Reflector films available from 3M Company are particularly suited for such a use.

Light reflected by the opposing end 211 of the light guide 202 and propagating within the light guide 202 in a direction back toward the light source 203 encounters the structured surface 206 again. As the light is propagating in a direction toward the light input area 205, it encounters a portion of the structured surface 213 that extracts light out of the light guide. As described above and illustrated more fully below, the structures can have a configuration and arrangement such that light in the light guide will only encounter the structures that specifically direct light out of the light guide when propagated in a direction toward the light source. In certain embodiments, not all of the light in the light guide may be extracted before the light returns to the light input area 205. In such a case, at least a portion of the light input area 205 is reflective. This may be accomplished for example, by disposing a specular reflector on portions of the light guide 202 forming the light input area 205 to leave only an input aperture for the light. In this manner, light remains in the light guide 202 and does not escape to an area where it cannot be used.

In the embodiment illustrated in FIG. 2, the light is contained within the light guide by TIR. In such a system, a certain portion of light propagating within the light guide light may exit the light guide by frustrated TIR. An additional bottom reflector 217 may be provided to direct light exiting the light guide through the bottom surface back toward the light guide and ultimately toward the light emitting surface 204. The illumination device 201 depicted in FIG. 2 can be used to illuminate a display module 219 such as an LCD panel.

In the above embodiment light is contained within the light guide for a substantial period of time (i.e., the light under goes a number of bounces in the light guide) before extraction. This results in part from extracting the light predominantly when the light is returning back towards the light input area. As a result, the light guide provides a mixing function that improves the uniformity of the light extracted out of the light guide. Furthermore, such a light guide can be used to mix colors within the light guide such that by the time the light is extracted a uniform, white light source can be obtained.

Figure 3:
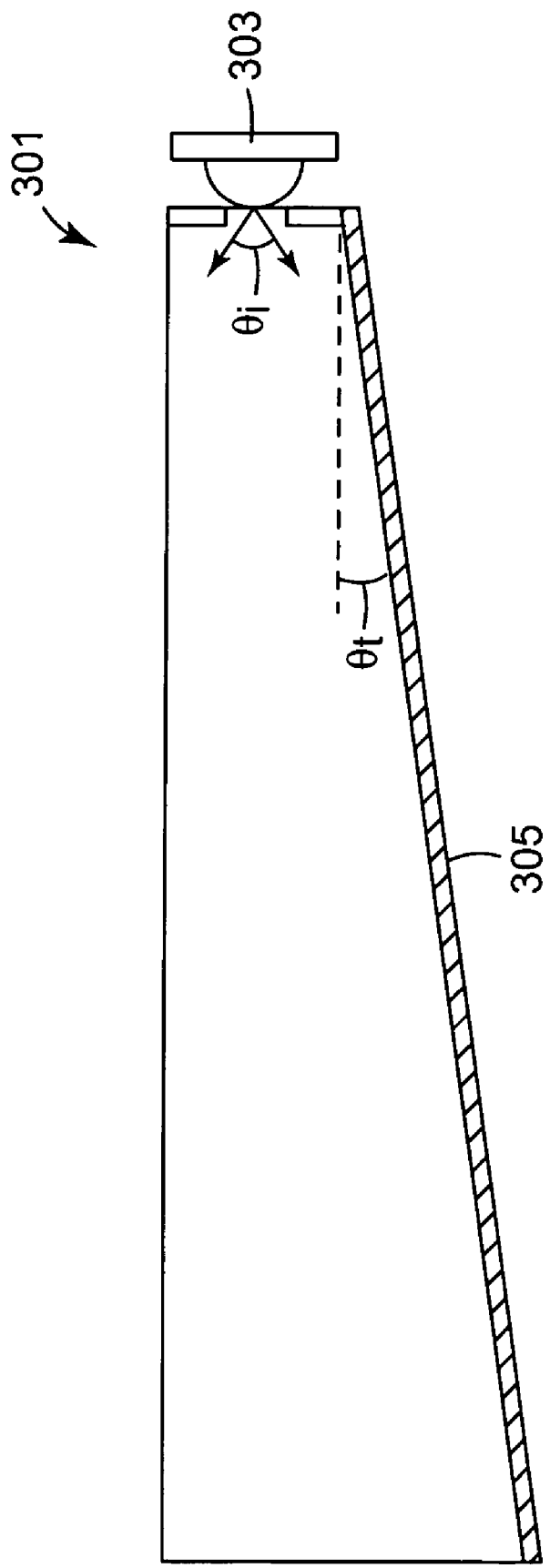
FIG. 3 illustrates a lighting system in accordance with another embodiment of the present invention.

As noted previously, various aspects of the present invention can be applied to a variety of applications and the invention is not limited to any particular type of light guide. One light guide particularly suited for use in connection with the present invention is a tapered light guide as depicted in FIG. 3. As will be appreciated, when a solid light guide is used, light from a light source 303 is introduced into a light guide 301 over a range of angles $\theta_i$ such light will propagate within the light guide by TIR at the surfaces of the light guide. The light guide depicted in FIG. 3 is tapered such that it increases in thickness in a direction away from the light source 303. The general amount of taper can be defined by the angle $\theta_t$ relative to a plane substantially normal to the input surface of the light guide 301.

At least one surface 305 of the light guide depicted in FIG. 3 is structured as generally described above to extract light from the light guide 301. In such a light guide, the structures are designed such that light propagating in the light guide in a direction of increasing taper is not extracted, or is extracted substantially less than light propagating in the light guide in a direction of decreasing taper. The level of taper $\theta_t$ in the light guide is selected taking into account the particular features of the light extraction structures as well as the range of angles $\theta_i$ at which light is provided into the light guide 301. Typically, as the taper angle $\theta_t$ gets smaller, it is desirable or necessary to decrease the input angle $\theta_i$ of light. In accordance with one embodiment of the invention, a collimating structure can be disposed between the light source 303 and the input surface of the light guide in order to decrease the input angle $\theta_i$. In one particular embodiment a collimating structure can be incorporated into the input surface of the light guide. It is desirable that such a structure collimate in a direction orthogonal to the plane of the light guide while leaving the light in the plane of the light guide uncollimated. This uncollimated light provides for spatial and spectral mixing and uniformity. Reducing the input angle $\theta_i$ allows one to reduce the taper angle $\theta_t$. As used herein, the term collimating means to decrease the angular distribution of light and is not intended to only refer to perfect collimation. One advantage of decreasing the taper angle $\theta_t$ is that it allows an overall thinner construction to be obtained. As noted above, the angle of the taper can be reduced to zero (i.e., a non-tapered light guide), if desired.

Figure 4:
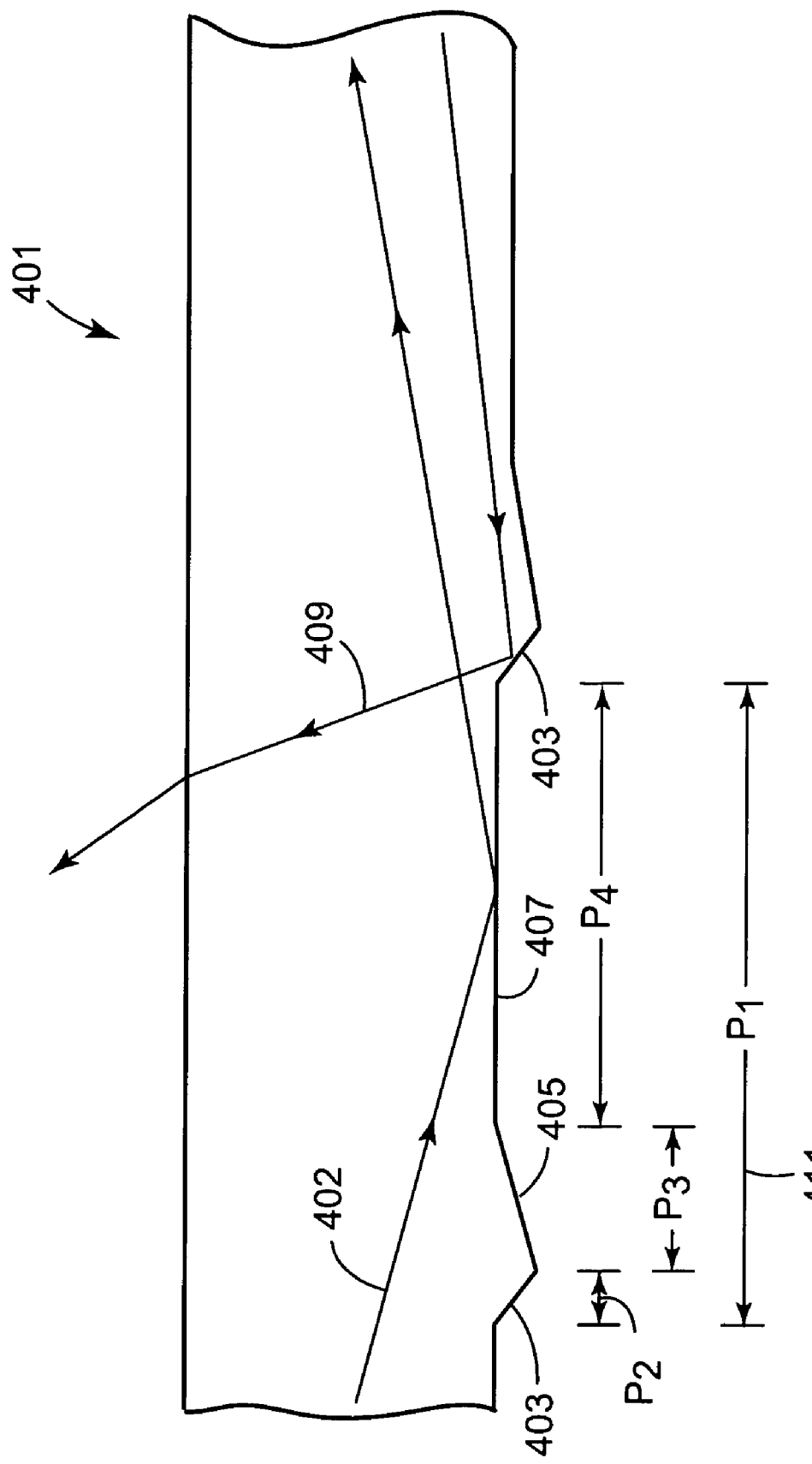
FIG. 4 illustrates a light extraction structure in accordance with an embodiment of the present invention.

As noted above, a variety of different extraction structures can be used in accordance with the present application. A number of specific embodiments of extraction structures are depicted below. These embodiments illustrate the design criteria that can be used to accomplish the desired extraction and further depict specific embodiments that are particularly suited for use in the present invention. FIG. 4 illustrates a portion of a light guide 401 having extraction structures formed thereon. A light ray 402 is depicted with light propagating in the light guide 401 in a direction away from a light source (not shown). The extraction structures include a number of shadowed facets 403. The angle of these facets is selected in conjunction with the input angle of light, as well as the angle of taper, if any, so that the light ray 402 does not encounter the shadowed facets. The extraction structures have additional facets 405, 407 having angles selected to allow light propagating in a direction from the light source to continue propagating within the light guide when it encounters the structures.

In FIG. 4 an additional light ray 409 is illustrated with the light propagating in the light guide 401 in the opposite direction (i.e., toward the light source). The angle of the shadowed facet is further selected so that a significant portion of light propagating in this direction will encounter the facet such that the light will undergo TIR at the facet and will be redirected at an angle that allows the light to escape from the light guide 401.

The light extraction structures of the embodiment depicted in FIG. 4 forms a repeating pattern of facets. The repeating pattern can be divided into unit cells 411. In one particular embodiment of the invention, these unit cell structures can be identical throughout the length of the light guide. This is particularly advantageous in applications where different size light guides are needed because the light guide structures do not need to be changed depending upon the length of the light guide. In one exemplary embodiment, the unit cell length P1 may be about 1.5 millimeters. In such a system, the pitch of the extraction facet P2 may be on the order of 0.02 millimeters with the pitch of the riser facet 405 P3 on the order of 0.5 millimeters and a substantially longer facet P4 on the order of 1 millimeter.

Figure 5:
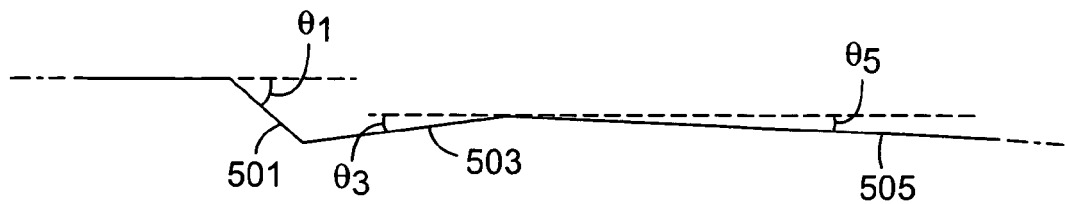
FIG. 5 illustrates another light extraction structure in accordance with one embodiment of the invention.

It will be appreciated that various extraction structures and features may be used to provide uniform extraction of light from the light guide and to allow light to remain in the light guide a sufficient amount of time in order to accomplish the mixing and uniformity improvements. FIG. 5 illustrates a structured portion of a light guide using facets and an overall taper to efficiently mix and/or extract light uniformly from the light guide. A unit cell of the structure is made up of three facets 501, 503 and 505, with at least one of the facets being shadowed as described above. The angle of each facet $\theta_1$, $\theta_3$ and $\theta_5$ is measured relative to a plane that is approximately normal to the input area of the light guide and parallel to the opposing surface of the light guide (allowing for slight inclinations provided for mold release and other fine structures that may be placed on the surface). In this embodiment, the angle $\theta_1$ of the first facet 501 is selected to shadow the facet and may be on the order of 25° to 50°. In one preferred embodiment, this angle is selected to be on the order of 30° to 40°. The angle $\theta_3$ of the next facet 503, serves primarily to bring the light guide back towards its opposing surface to reduce the overall thickness of the light guide. This angle $\theta_3$ is on the order of 0.1° to 15°. In one preferred embodiment, this angle is selected to be on the order of 1° to 5°. The angle $\theta_5$ of the third facet 505 is selected to provide a desired overall taper to the light guide (e.g., is selected to roughly corresponds to the gross taper of the overall light guide). This angle $\theta_5$ is typically comparable to $\theta_3$. For example, in one preferred embodiment, this angle is selected to be on the order of 1[] to 2°. In one particular embodiment, the facet angles $\theta_1$, $\theta_3$, and $\theta_5$ are respectively 35°, 1.2° and 1.1°. These angles are advantageously chosen in order to efficiently extract light out of the light guide while obtaining uniform surface illumination.

Figure 6:
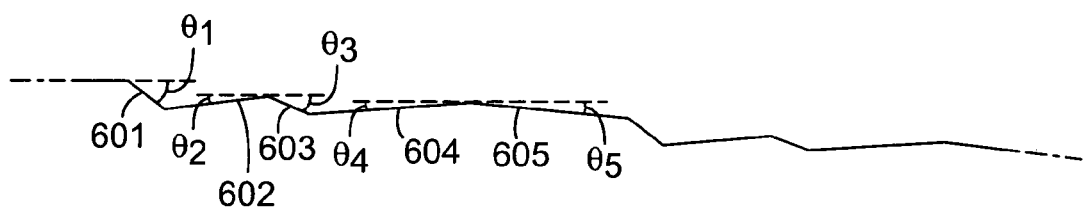
FIG. 6 illustrates another light extraction structure in accordance with another embodiment of the invention.

FIG. 6 illustrates still another series of extraction facets that could be formed in a unit cell. In this construction, the unit cell is made up of five different facets 601, 602, 603, 604 and 605. Each of these facets defines an angle relative to a common plane $\theta_1$, $\theta_2$, $\theta_3$, $\theta_4$, and $\theta_5$, respectively. An advantage of this more complicated extraction structure is that extraction of the light that leaks out of the bottom of the light guide and is reflected back into the light guide can be controlled with respect to its angular output and extraction efficiency. This may also be desirable when shorter light guides are used because more light is extracted per unit length. For longer light guides these features may reduce the visibility of the structures. In one particular embodiment, it is desirable that the angles have the following values of about 35°, 1.7°, 30°, 1° and 1.2, respectively.

Figure 7:
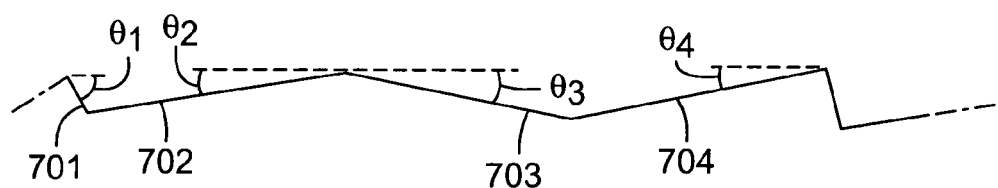
FIG. 7 illustrates another light extraction structure in accordance with still another embodiment of the invention.

FIG. 7 illustrates an example of extraction structures disposed on a portion of a light guide with facets particularly suited for use in a non-tapering light guide. In FIG. 7, a first extraction facet 701 is constructed to be shadowed from light propagating within the light guide from a light source (not shown) located to the left of the extraction facet. Additional facets 702, 703 and 704 are provided with angles selected such that the overall thickness of the light guide does not increase (i.e., does not taper) in a direction away from the light source. An advantage of such a structure is that the light guide can be made thinner than a light guide that includes a taper. The angles of the facets are selected such that light propagating within the light guide is only or predominately extracted by the shadowed extraction facet 701 when the light is propagating in a direction toward the light source. In accordance with one embodiment, the angles of the facets are selected to be about 25°, 0.8° and 0.5° degrees respectively. As described above, such a design can be used to provide an overall thin device while still providing uniform light extraction and/or mixing.

A wide variety of structures including the number and angle of facets can be used in accordance with the present invention. Generally, the structures, facets, angles, etc., are selected to achieve spatial uniformity, cosmetic appearance and desired angular distribution of the light output.

Figure 8:
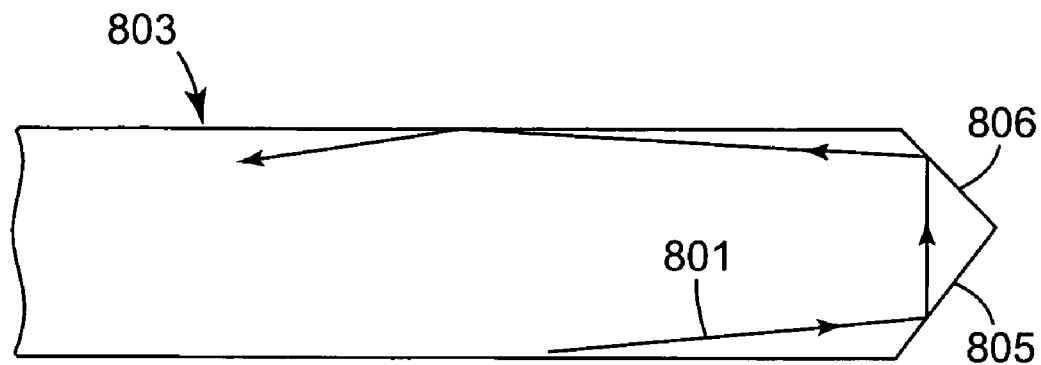
FIG. 8 illustrates an embodiment of a reflective light guide end in accordance with one embodiment of the invention.

As described above, it is desirable to minimize the amount of light exiting the light guide from an edge of the light guide. In one embodiment of the invention using a solid light guide, the edge of a light guide is structured such that light under goes TIR at the edge of the light guide. In this manner light is redirected back into the light guide and encounters the extraction structures as described above. One such structure is illustrated in FIG. 8. Light 801 propagating within the light guide 803 encounters facets of a structured edge 805, 806 and undergoes total internal reflection at each of the facets. In this manner the light is redirected and remains in the light guide with the propagation direction changed.

Figure 9:
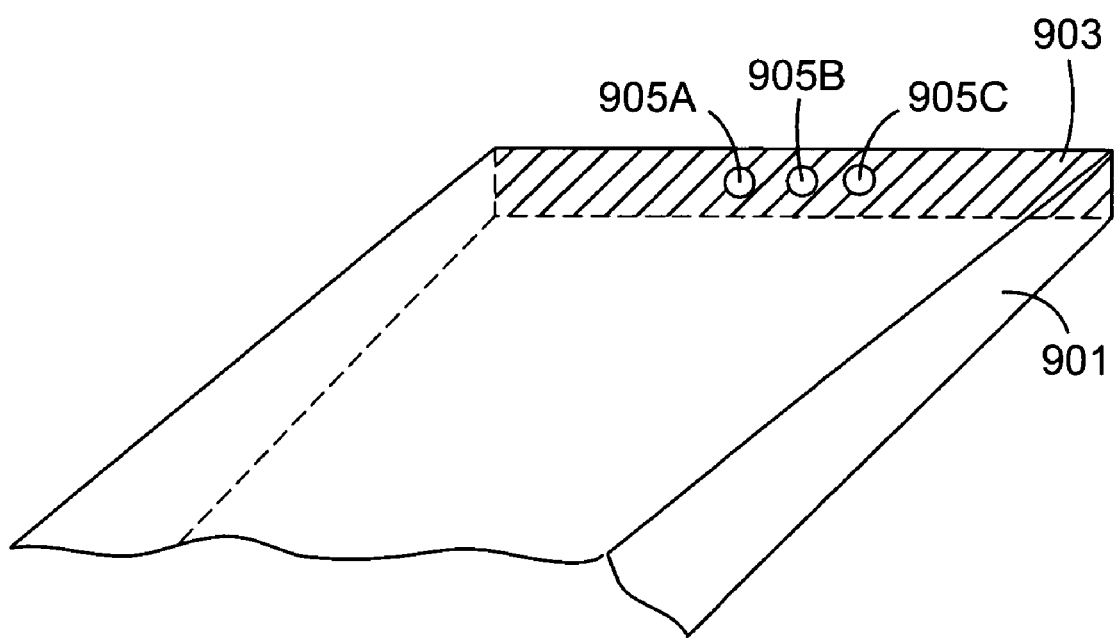
FIG. 9 illustrates a lighting system in accordance with yet another embodiment of the invention.

It is also important, as noted above, that the light source end of the light guide reflects light propagating within the light guide (i.e., that light does not escape from the edge of the light guide into which light is introduced). In one embodiment, illustrated in FIG. 9, a light guide 901 has a reflective area (e.g., a reflective material or surface) substantially covering the light input area 903 of the light guide

901. Apertures within the reflective area (three in the specific illustrated embodiment 905a, 905b, 905c) allow light to be introduced into the light guide. Three light input apertures can be used, for example, to input light of different colors to form white or other desired blended light. Alternatively, multiple apertures may be used to input light of the same color, or white light, in order to increase the overall brightness of the system. One advantage of the present invention is that light from a few or multiple light sources will be equally mixed within the light guide to produce an overall uniform lighting surface.

Figure 10:
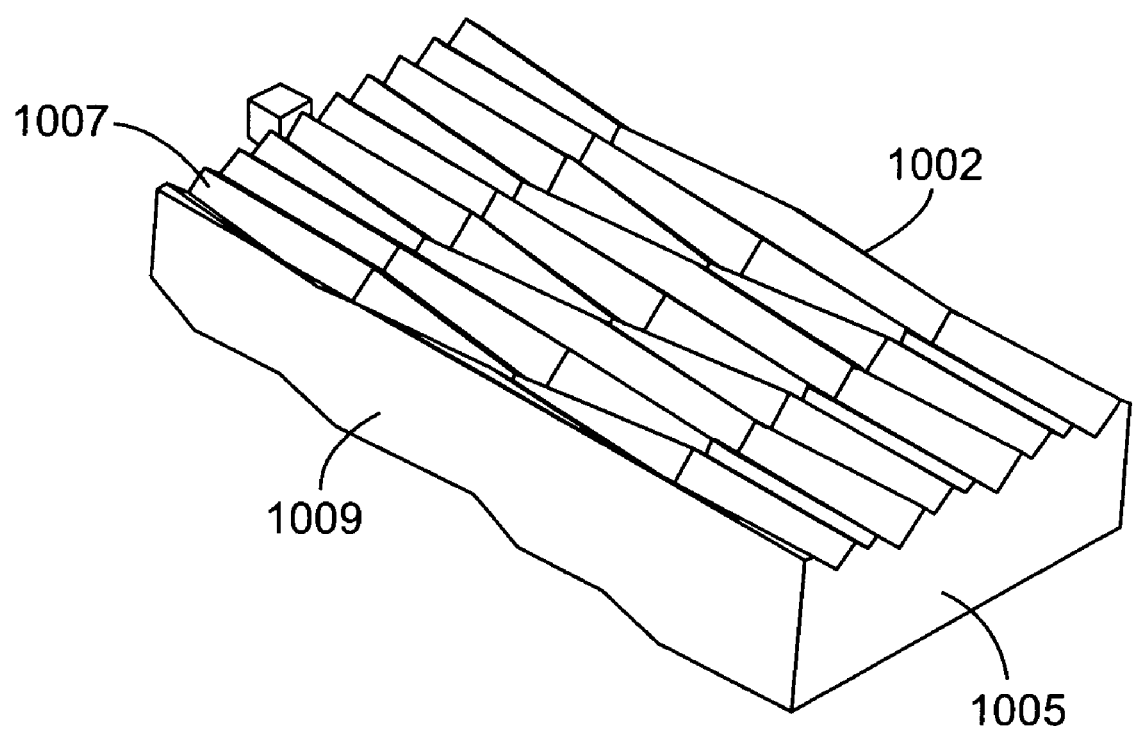
FIG. 10 illustrates a lighting system in accordance with another embodiment of the invention.
Figure 11:
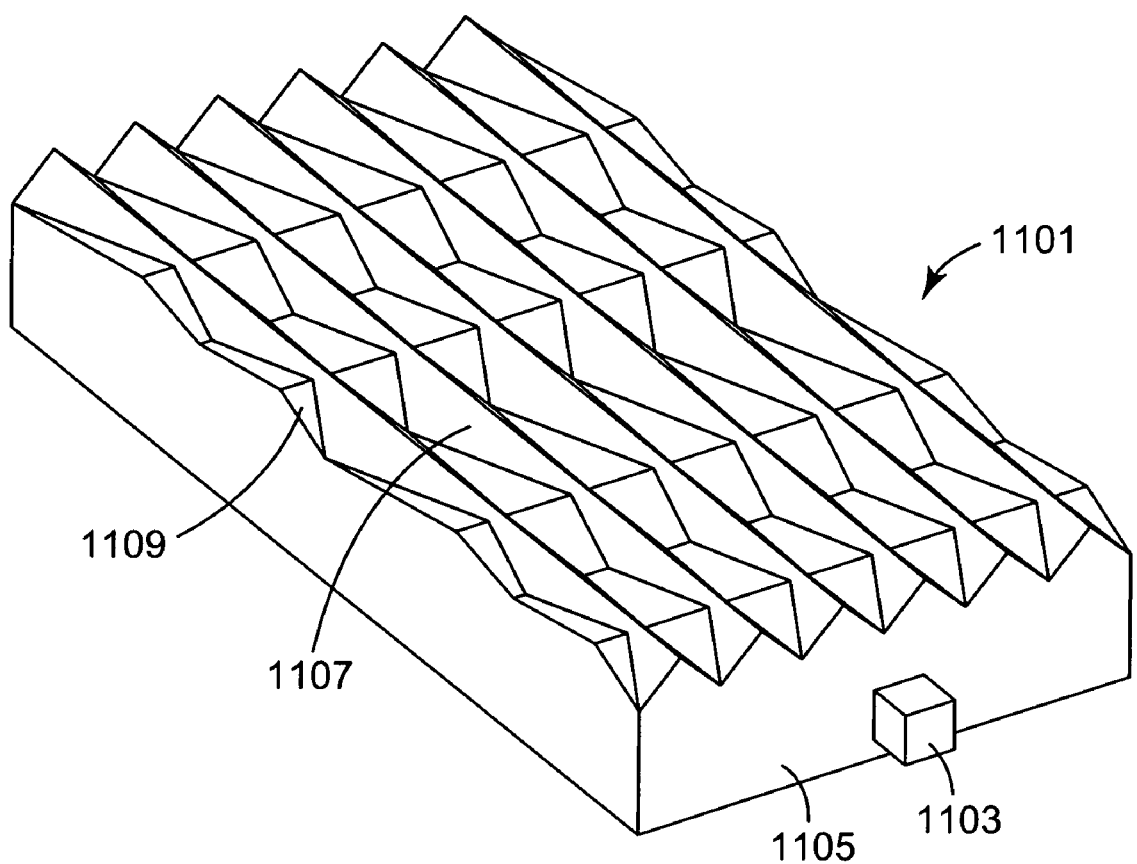
FIG. 11 illustrates a lighting system in accordance with still another embodiment of the invention.
Figure 12:
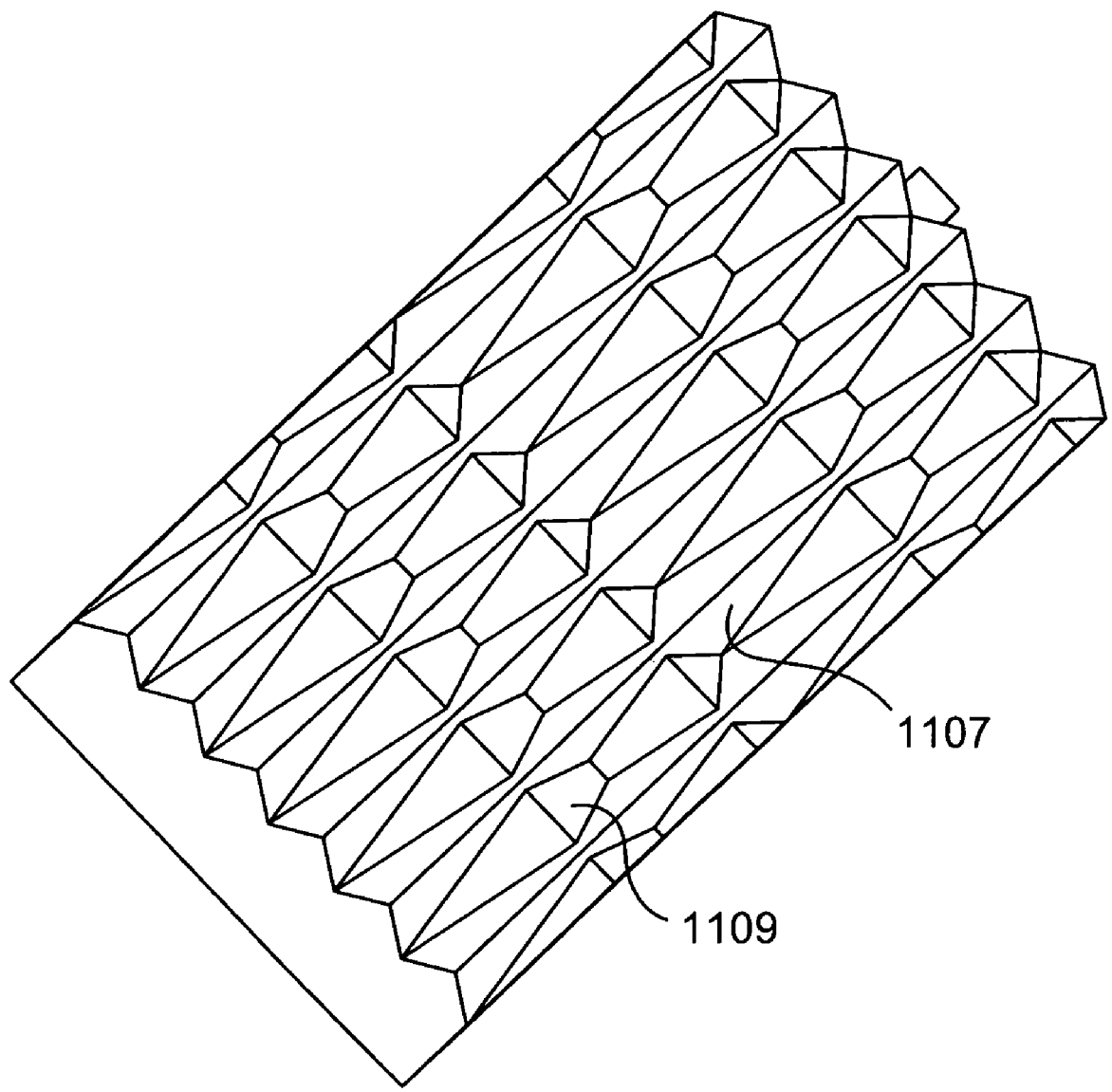
FIG. 12 illustrates a lighting system in accordance with another embodiment of the invention.

The extraction structures described above are provided with facets generally in a direction orthogonal to the path of light rays propagating between the light input surface of the light guide and the opposing surface of the light guide. The extractions structures allow light to propagate within the light guide for a sufficient distance to permit mixing and to improve uniformity prior to extraction. It will be further appreciated that it may be desirable to extract light from the light guide in a controlled angular fashion in two directions. This may be done by including structures on the light guide in a direction orthogonal to the extraction facets in order to compress or otherwise control the angular output of light in that direction. FIGS. 10, 11 and 12 depict various structures that may be used to extract light out in a manner that provides angular control in a direction orthogonal to the propagation direction.

In one particular embodiment of the invention, light is extracted in a controlled angular manner in two directions by including a second set of structures on the light guide in a direction orthogonal to the extraction facets whereby the second set of structures are contained within the light emission surface opposite the extraction surface. FIG. 10 depicts a light guide 1005 with extraction structures 1009 and with a second set of structures 1007 cut orthogonal to the extraction structures whereby the second set of structures are contained within the light emission surface 1002 of the light guide 1005.

In one particular embodiment of the invention, light is extracted in a controlled angular manner in two directions by including a second set of structures on the light guide in a direction orthogonal to the extraction facets whereby both sets of orthogonal structures are contained within the same face of the light guide. FIGS. 11 and 12 depict a light guide with extraction structures 1109 and with a second set of structures 1107 cut orthogonal to the extraction structures whereby both sets of structures are contained within light guide 1105 face 1101.

Figure 13:
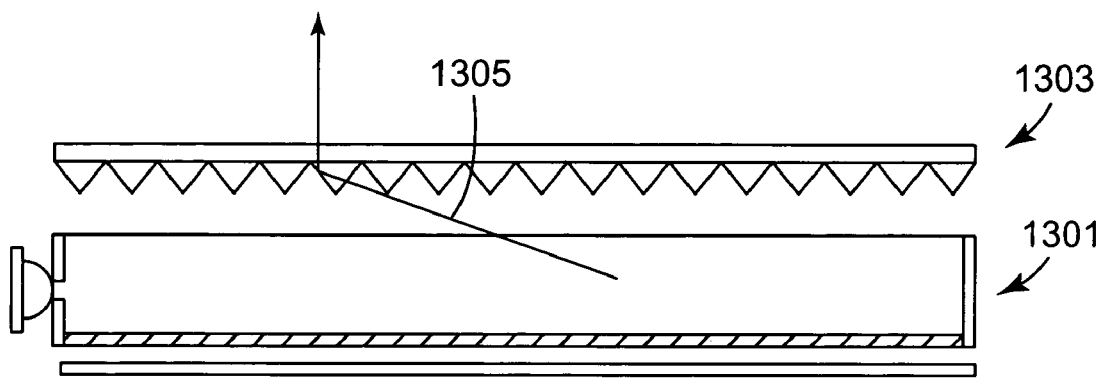
FIG. 13 illustrates a lighting system in accordance with yet another embodiment of the invention.

In many applications it is desirable to control the angular distribution of output light. One advantage of a particular embodiment of the present invention is that light can be output from the light guide in a fairly narrow angular distribution. Referring to FIG. 13, in accordance with one aspect of the present invention a planar light source 1301, such as the various structures described herein, is combined with a structured film such as a prismatic film 1303 having a number of prisms formed on at least one surface of the film. The prism film is disposed such that the prisms face the light source. In this embodiment the light guide is constructed such that light from the light source 1305 exits the light guide with a fairly small range of angles. For example, in one embodiment the light may exit the light guide having an angular range from about 70° to 90° degrees measured from the normal of the light guide. The prismatic film 1303 is used to redirect the light from this narrow angle relative to the plane of the light source to a direction closer to the normal of the plane of the light source as illustrated in FIG. 13.

Figure 14:
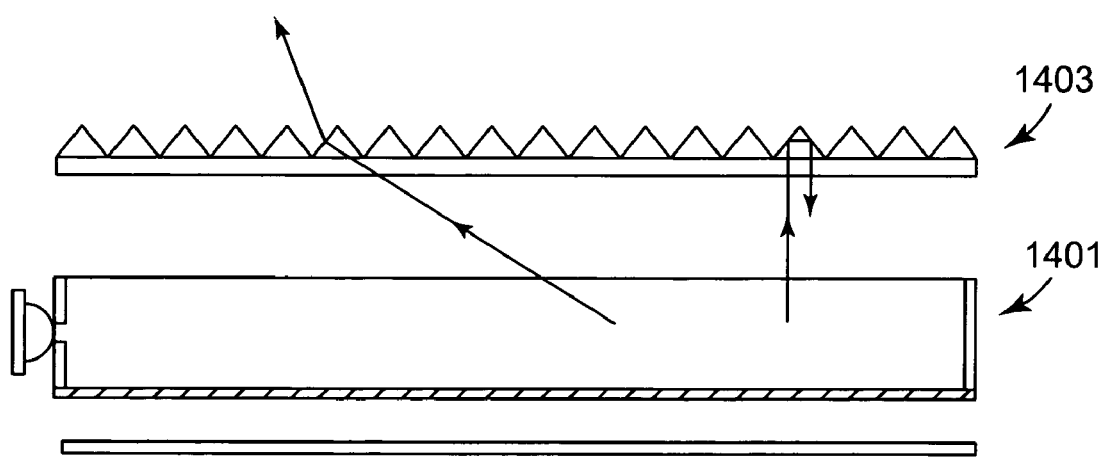
FIG. 14 illustrates a lighting system in accordance with still another embodiment of the invention.

In another embodiment of the present invention, a structured film such as prismatic film having prisms facing away from the light source can be used to redirect the light. The operation of such a film is illustrated in FIG. 14. Light exiting the light guide 1401 at a relatively large angle relative to the normal of the light guide is refracted by a prismatic surface of the prism film 1403. As will be understood by those of skill in the art, light exiting the film at an angle approximately normal to the plane of the light guide will be retroreflected by the prismatic surfaces. This light will be recycled by the backlight into wider-angle light for ultimate refraction and transmission through the structured film 1403. A number of structured films are suitable for use in connection with the present invention. For example, any of a variety of Brightness Enhancement Films, such as those available from 3M Company, are suitable for use in connection with the present invention. A variety of include angles of such films may be used. For example angles ranging from 80 to 110° degrees are particularly suited for use in connection with the invention. The films may have multiple facets, rounded facets, or combinations thereof. Any film that redirects light to a desired angle can be used.

Figure 15:
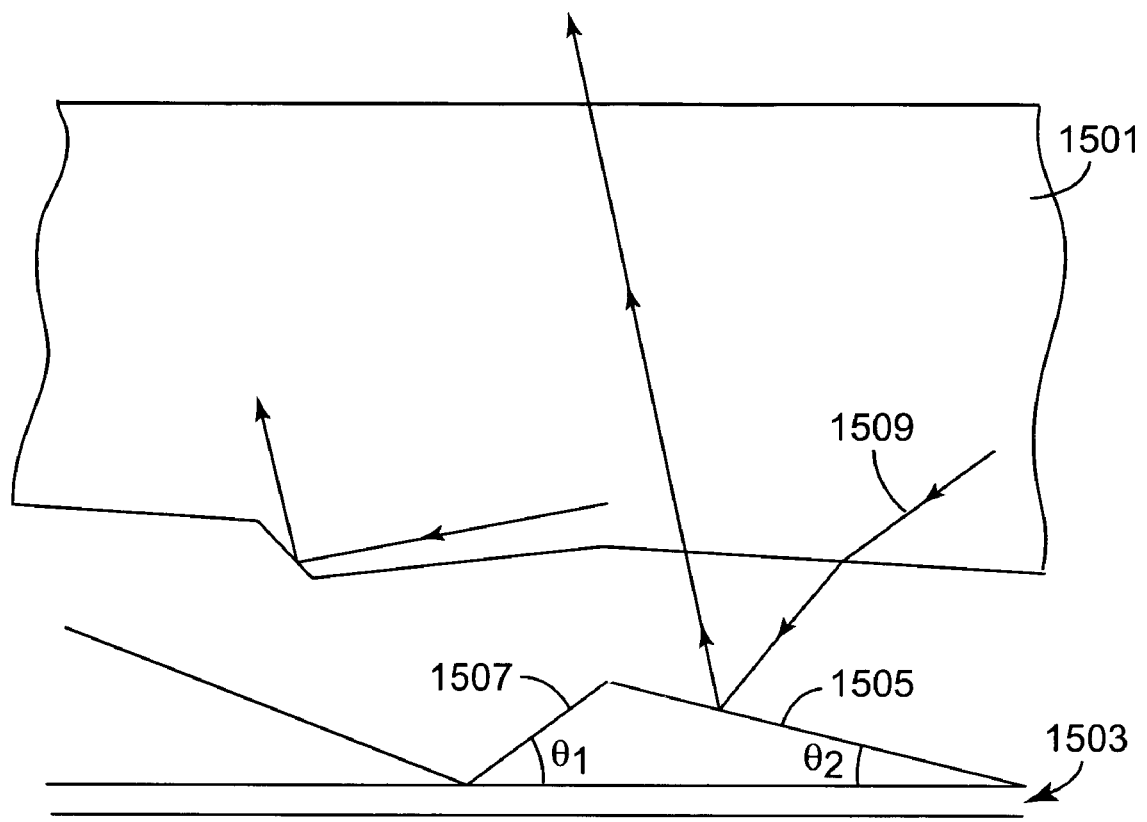
FIG. 15 illustrates a portion of a lighting system including a reflector in accordance with an embodiment of the invention.

In another embodiment of the invention, the angular distribution of light coming from the light guide may also be controlled using a structured reflective surface disposed below the light guide. One such embodiment is illustrated in FIG. 15. A portion of a light guide 1501 of the type described throughout the present specification is depicted. As described above, light propagating within the light guide may exit the bottom of the light guide by frustrated TIR. In accordance with a particular embodiment of the invention, a reflector 1503 is provided near the bottom surface of the light guide. The reflector has reflective facets 1505, 1507 on one of its the surfaces. A light ray 1509 exiting the light guide through the bottom surface encounters the reflector 1503. This light is reflected in a desired direction. The directionality of light reflected from the bottom reflector can be selected in conjunction with the overall construction of the light guide 1501 to obtain a desired angle distribution. Angles $\theta_1$ and $\theta_2$ for the reflective structure can be appropriately selected redirect the light extracted from the bottom of light guide in a direction that ultimately coincides with the light extracted by the extraction structures on the light guide. In accordance with one particular embodiment of the invention, angles $\theta_1$ and $\theta_2$ are selected to be 60° to 80° and 10° to 30° respectively. For example, angles of about 65° and 22°, respectively would be suitable for use in conjunction with a variety of light guides of the type described above.

Figure 16A:
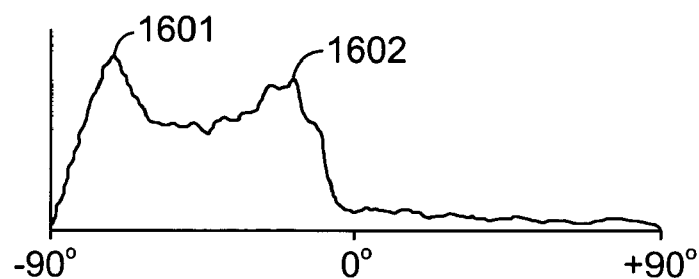
FIGS. 16(a)–16(d) illustrate modeled light output for various lighting systems in accordance with an embodiment of the invention.
Figure 16B:
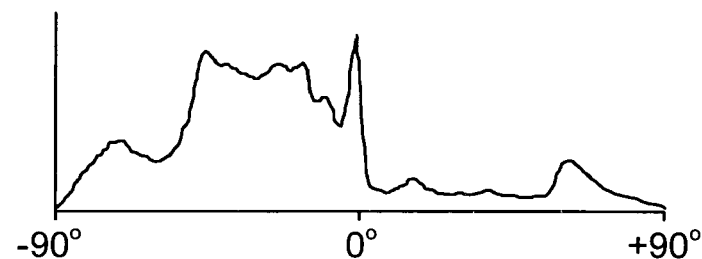

FIGS. 16a–16d illustrate modeled light output of a system of the type previously described. Each Figure was modeled for the same light guide, which has a construction similar to that illustrated in FIG. 6. The illustrated distribution of light is for light in a plane containing the normal to the emission surface and the main light guide axis. FIG. 16a illustrates the distribution of light output from the light guide alone. As will be appreciated from FIG. 16a, two distinct lobes of brightness 1601, 1602 are observed. FIG. 16b illustrates light output of a system in which a structured bottom reflector of the type depicted in FIG. 15 is combined with the light guide. As illustrated in FIG. 16b, when an appropriate structured reflector is combined with a light guide of the present invention, a light output has a substantial lobe with its center closer to the normal of the plane of the light guide.

Figure 16C:
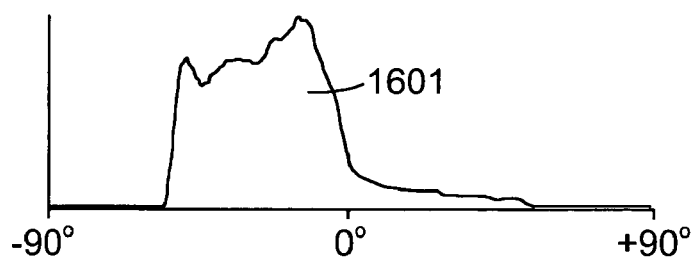

FIG. 16c illustrates the modeled light output for a system generally of the type depicted in FIG. 14. In this system, the light guide is combined with a flat bottom reflector and a sheet of prismatic film such as 3M's Vikuiti brand Brightness Enhancement Film. As will be appreciated, the combination of the light guide with a sheet of structured enhancement film concentrates a larger percentage of light in a direction substantially normal to the plane of the film as illustrated by lobe 1601.

Figure 16D:
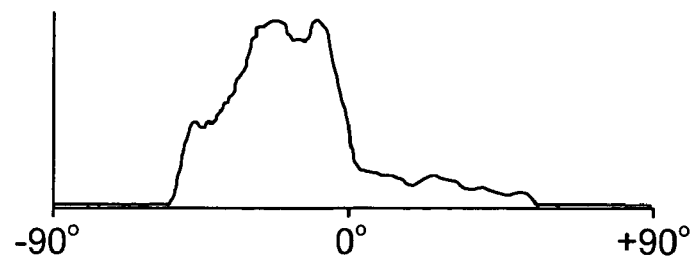

FIG. 16d illustrates a system combining a light guide of the present invention with both a prismatic film and a structured reflector. In such an embodiment even more of the light is concentrated around the normal for an overall brighter on-axis display.

As will be appreciated from FIGS. 16a–16d, providing prisms on the bottom reflector can be used to collect light that does not undergo TIR on the bottom surface of the light guide. By adjusting the geometry of the structured reflector, both the light undergoing TIR and light being extracted through the bottom can be concentrated towards the viewer. The viewing angle may be adjusted by changing the light guide design. It will be further appreciated that by adding a prismatic sheet, with prisms running perpendicular to the extraction structures on the light guide, the light may be concentrated into a narrower viewing region. When both a structured reflector and a prismatic sheet are used in conjunction with the light guide, a larger, brighter lobe can be obtained around the normal of the light guide. A structured reflective film particularly suited for the present invention can be made from a structured Enhanced Specular Reflector film available from 3M Company.

As noted above, it is typically required that a light guide be substantially uniform. Brightness uniformity can be measured using a measurement technique where on-axis luminance is measured at multiple points (e.g., nine or thirteen-points) spaced about the display. Typically a maximum of 10–20% variation between the highest and lowest luminance values is considered acceptable when the light guide is used with an LCD. In accordance with one embodiment of the present invention, a diffusion mechanism is provided to further improve brightness uniformity. In one embodiment this is accomplished by placing a diffuse sheet above the light guide. In alternative embodiments, recycling optical films such as 3M's Vikuiti brand Brightness Enhancement Film (e.g., as described above) or a reflective polarizer such as Vikuiti brand Dual Brightness Enhancement Film can be used to provide improved uniformity. In still another embodiment, bulk or surface diffusion properties can be provided within or on a surface of the light guide to improve uniformity. In another embodiment, the extractions structures may include diffusion properties. For example, the height of the extraction structures along the length of the structures may be varied deterministically or randomly. In one particular embodiment the depth and/or pitch of the structures can be varied to provide diffusion in the length direction of the structure.

Figure 17:
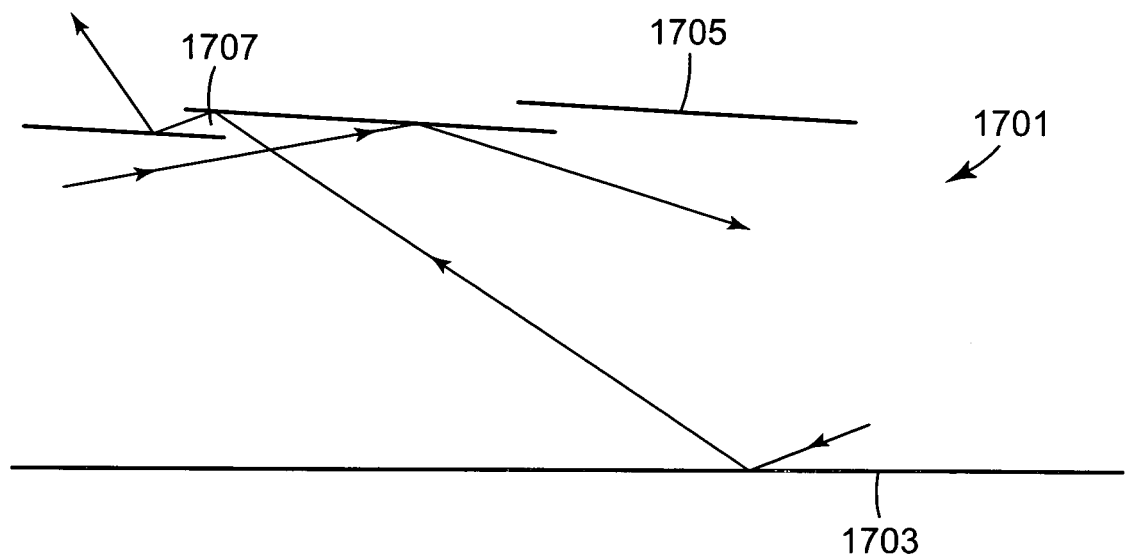
FIG. 17 illustrates a portion of a hollow light guiding system accordance with an embodiment of the invention.

The present invention is not particularly limited to light guides which operate under the principal of total internal reflection. More particularly, the present invention is directed to a variety of light guides having structures that extract light from the light guide preferentially based upon the direction of propagation. FIG. 17 illustrates an embodiment of a light guide 1701 formed by hollow reflective surfaces 1703 and 1705. Light propagating in a first direction within the guide away from the light source is reflected by the top and bottom surfaces 1705 and 1703 and continues to propagate. The reflective structures have gaps or openings 1707 through which a certain percentage of light propagating in a direction toward the light input area would be extracted. It will be appreciated that a number of different geometries and constructions can be used in order to extract light out of a hollow light guide where the light is preferentially extracted to a greater degree when light is propagating in a direction toward the lighted surface.

Figure 18:
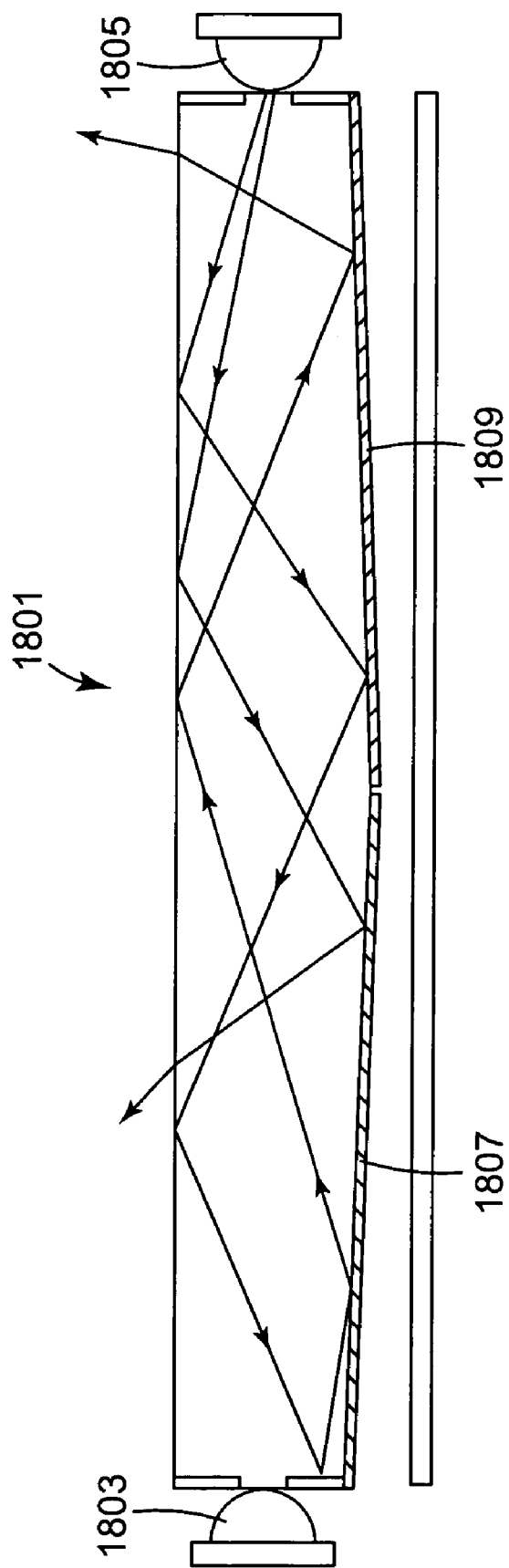
FIG. 18 illustrates a lighting system in accordance with still one more embodiment of the invention.

One important aspect of the present invention is that light remains in the light guide for a period of time long enough for the light to be adequately mixed and/or sufficiently homogenized to provide uniform illumination. While in the above embodiments, the light sources are depicted as being on one side of the light guide, the present invention is not limited to such a construction. The present invention includes light guides having light input into multiple sides of the light guide. One such system is illustrated in FIG. 18. In accordance with this particular embodiment of the invention, a light guide 1801 includes at least two light sources 1803, 1805 provided on opposite sides of the light guide. On a first portion of the light guide near the first light source 1803 a structure is provided which extracts light out of the light guide when light is propagating in a direction towards the first light source 1803. On a second portion of the light guide near a second light source 1805 structures 1809 are provided which extract light out of the light guide when the light is propagating in a direction toward the second light source 1805. As will be appreciated from this construction, light from the first light source 1803 will propagate within the light guide over a substantial portion of the light guide. For example, in the illustrated embodiment, the light will be reflected within the first half of the light guide prior to encountering extraction structures that would allow the light to be extracted. While the light guide in FIG. 18 is not to scale, one of skill will recognize that when such a lighting system is implemented light propagating in the light guide will undergo many bounces prior to reaching the extraction structures that extract light from the guide. In the illustrated embodiment, light that reaches the far end of the light guide will be reflected and returned towards the original light source. This light will again have an opportunity to be extracted from the light guide as it reaches the portion of the light guide near the original light source.

The advantages of the present invention will be appreciated from the above description. The invention should not be considered limited to the preferred embodiments. Alternative embodiments may be readily apparent to the skilled artisan upon review of the present specification. For example, while geometric structures have been described, it will be recognized that diffractive structures could be used to accomplish certain of the described functions. In one such example, the shadowed facets could have diffractive features that control the extraction efficiency and direction of light. While the above description describes linear structures running the width of the light guide, the invention could also be implement using segmented or discrete structures or structures having different, non-linear shapes. While the particular embodiments of extraction structure described above for solid light guides used TIR, it will be recognized that any reflective surface could be used. The present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the instant specification.

We claim:

1. A light guide, comprising:
   a light input area through which light is introduced into the light guide; and
   first and second opposing surfaces between which light introduced into the light guide propagates, wherein a portion of the light guide near the light input area has extraction structures configured and arranged to extract more light out of the light guide when light is propagating in the light guide in a direction toward the light input area than when light is propagating in the light guide in a direction away from the light input area, and further comprising additional structures disposed on at least one of the first and second opposing surfaces, the additional structures being configured and arranged to control the angular direction of light extracted from the light guide in a direction that is substantially orthogonal to a principal axis of the extraction structures.

2. A light guide as recited in claim 1, wherein the extraction structures comprise facets on at least one surface, at least some of which are shadowed from light introduced from the light input area when the light is propagating in the direction away from the light input area.

3. A light guide as recited in claims 1, wherein the first and second opposing surfaces diverge in a direction away from the light input area.

4. A light guide as recited in claims 1–3, wherein the first and second opposing surfaces comprise surfaces of a solid light guide.

5. A light guide as recited in claim 4, wherein the extraction structures comprises facets on a surface of the light guide, wherein light is contained within the light guide as it propagates between the first and second opposing surfaces by total internal reflection and is extracted from the light guide by total internal reflection at the interface of at least one of the facets.

6. A light guide as recited in claims 1–3, wherein the extraction structures comprise a plurality of unit cells, each unit cell comprising a plurality of facets including at least one facet that is shadowed from light introduced from the light input area when the light is propagating in the direction away from the light input area.

7. A light guide as recited in claims 1–3, wherein the extraction structures are distributed over the length of at least one of the first and second surfaces.

8. A light guide as recited in claim 6, wherein the unit cell comprises at least three facets each facet makes an angle with respect to a common plane of the light guide of about 25° to 50°, 0.1° to 5°, and 1° to 2°, wherein the facet making the angle of 25° to 50°, is shadowed.

9. A light guide as recited in claim 8, wherein the extraction structures comprise structures wherein facets that are shadowed make an angle of about 30° to 40°.

10. A light guide as recited in claim 1, wherein the extraction structures comprise facets running along a first axis and the additional structures comprise facets running along a second axis different than the first axis.

11. A light guide as recited in claim 10, wherein the first axis is orthogonal to the second axis.

12. A light guide as recited in any of claims 10–11, wherein the additional structures are disposed on a surface opposite the extraction structures.

13. A light guide as recited in any of claims 10–11, wherein the additional structures are disposed on the same surface as the extraction structures.

14. An illumination system, comprising:
   a light source,
   a light guide as recited in any of claims 1, 2, 3, 5, 10 or 11.

15. An illumination system as recited in claim 14, further comprising a structured film disposed to receive and redirect light extracted from the light guide.

16. An illumination system as recited in claim 15, where in the structured film comprises a plurality of linear prisms.

17. An illumination system as recited in claim 14, wherein one of the first and second surfaces forms a light emitting surface, the illumination system further comprising a structured reflector disposed adjacent the surface of the light guide opposite the light emitting surface to redirect a portion of light escaping through the adjacent surface back toward the light guide.

18. An illumination system as recited in claim 15, wherein one of the first and second surface forms a light emitting surface, the illumination system further comprising a structured reflector disposed adjacent the surface of the light guide opposite the light emitting surface to redirect a portion of light escaping through the adjacent surface back toward the light guide.

19. An illumination system as recited in claim 14, wherein the light source comprises at least one point light source.

20. An illumination system as recited in claim 19, wherein the light source comprises at least one LED.

21. An illumination system as recited in claim 20, wherein the light source comprises a plurality of LEDs, at least two of the plurality of LEDs being a different color.

22. A display comprising:
   a display panel; and
   an illumination system as recited in claim 14.

23. A display as recited in claim 22, wherein the illumination system further comprises a structured film disposed between the light guide and the display panel.

24. A display as recited in claims 22, wherein the illumination system further comprises a structured reflector, the display panel being disposed on a first side of the light guide and the structured reflector being disposed on an opposite side of the light guide.

25. A display as recited in claims 23, wherein the illumination system further comprises a structured reflector, the display panel being disposed on a first side of the light guide and the structured reflector being disposed on an opposite side of the light guide.

* * * * *

UNITED STATES PATENT AND TRADEMARK OFFICE
CERTIFICATE OF CORRECTION

PATENT NO. : 7,052,168 B2 Page 1 of 1
APPLICATION NO. : 10/738441
DATED : May 30, 2006
INVENTOR(S) : Kenneth A. Epstein It is certified that error appears in the above-identified patent and that said Letters Patent is hereby corrected as shown below:

Col. 6
Line 60, delete "he" and insert -- the --, therefor.

Col. 10
Line 3, delete "1[] to 2°" and insert -- 1° to 2° --, therefor.
Line 22, delete "1.2" and insert -- 1.2° --, therefor.

Col. 12
Line 38, delete "its the" and insert -- its --, therefor.

Col. 16
Line 46, in Claim 24, delete "claims" and insert -- claim --, therefor.
Line 51, in Claim 25, delete "claims" and insert -- claim --, therefor.

Signed and Sealed this

Twenty-ninth Day of April, 2008

JON W. DUDAS
*Director of the United States Patent and Trademark Office*